C. E. Cook.
Saw-Set.
N° 18,957.   Patented Dec. 29, 1857.
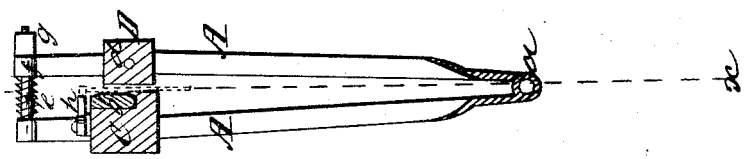
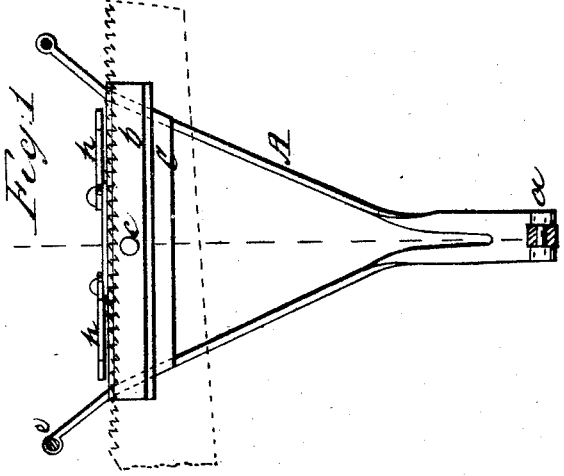
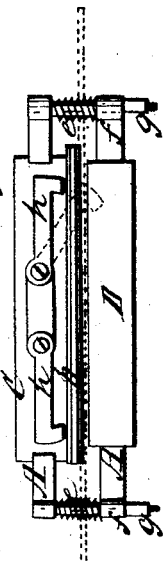

UNITED STATES PATENT OFFICE.

CYRUS E. COOK, OF CAMBRIDGE, OHIO.

CLAMP FOR SETTING SAWS.

Specification of Letters Patent No. 18,957, dated December 29, 1857.

*To all whom it may concern:*

Be it known that I, C. E. Cook, of Cambridge, in the county of Guernsey and State of Ohio, have invented a new and Improved Clamp to be Applied to Saws for the Purpose of Setting Them; and I do hereby declare that the following is a full, clear, and exact description of the same, reference being had to the annexed drawings, making a part of this specification, in which—

Figure 1, is a vertical section of my improvement taken in the line $(x)$ $(x)$ Fig. 2. Fig. 2, is a vertical section of ditto taken in the line $(y)$ $(y)$ Fig. 1. Fig. 3, is a plan or top view of ditto.

Similar letters of reference indicate corresponding parts in the several figures.

My invention consists in having two V-shaped frames connected by a joint or spring, each frame having a bar attached to it, the outer ends of the frames being provided with screws and a metallic bed fitted to one of the bars, the edges of the bar being beveled at different angles and the bar so arrenged that either edge may be adjusted to form the bed of the saw according to the required set to be given its teeth.

The object of the invention is to obtain a simple, cheap, and efficient clamp, and one that will facilitate to a very great extent the old plan of setting saws by means of a punch a mode which is still preferred by many mechanics.

To enable those skilled in the art to fully understand and construct my invention I will proceed to describe it.

A, A, represent two V-shaped metallic frames, the angles of which are connected by a joint $(a)$ or a thin strip of metal may answer equally well provided it is sufficiently elastic to allow the frames to open and close a requisite distance.

Near the opposite or wide distended ends of the frames A bars C, D, are secured, a bar in each frame. The bar C is secured permanently in its frame, and has a recess made in its inner side to receive a steel bar $(b)$ which is fitted on a pin $(c)$ at the center of the inner side of the bar C. The other bar D is secured in its frame by a rod $(d)$ which passes longitudinally through its center, the bar D being allowed to turn a trifle on the bar.

The end of one of the frames A have screw rods $(e)$ attached to them, one of each, and these rods pass through eyes $(f)$ at the ends of the other frame, the rods having thumb nuts $(g)$ placed on them, and the rods $(e)$ having spiral springs placed on them. To the upper surface of the bar C two short bars $(h)$ $(h)$ are pivoted. These bars serve as stops as will be hereinafter described.

The edges of the bar $(b)$ are beveled, and each edge or corner is beveled at a different angle from the others—and the bar $(b)$ may be removed from the pin $(c)$, turned, and either edge of the bar presented to the saw, so as to form its bed. The saw, shown in red, is placed between the bars C, D, and the bars $(h)$ $(h)$ being turned so as to project over or beyond the bar $(b)$ the teeth are brought upward in contact with the bars $(h)$ $(h)$. The caw is then clamped between the bar (D) and bar C by screwing up the nuts $(g)$. The bars $(h)$ $(h)$ are then moved back and the proper set given each alternate tooth by placing a punch against said teeth and tapping them with a hammer. The desired set or angle may be given the teeth by adjusting the proper beveled edge of the bar $(b)$ so that it will form the bed against which the teeth are driven and bent. When the alternate teeth are set the saw of course is reversed and the intermediate teeth set.

Many mechanics prefer the punch for setting saws, a better angle or inclination is given the teeth, the majority of saw sets curve the teeth and fail to give them a sharp angular or oblique position relatively with the saw plate.

Having thus described my invention, what I claim as new and desire to secure by Lettens Patent, is,

The two V-shaped frames A, A, connected at one end of a hinge $(a)$ or its equivalent and provided with the bars C, D, the adjustable steel or metallic bar $(b)$ provided with beveled edges and the bars or stops $(h)$ $(h)$, the frame being brought together by the screws $(e)$ and nuts $(f)$ the whole being arranged substantially as and for the purpose set forth.

CYRUS E. COOK.

Witnesses:
J. O. Grimes,
J. W. White.